United States Patent [19]

Suzuki et al.

[11] Patent Number: 4,822,557
[45] Date of Patent: Apr. 18, 1989

[54] EMERGENCY REACTOR CORE COOLING STRUCTURE

[75] Inventors: Hiroaki Suzuki, Hitachi; Michio Murase, Mito; Shigeo Hatamiya, Hitachi; Masanori Naitoh, Hitachi; Kenji Tominaga, Hitachi, all of Japan

[73] Assignee: Hitachi, Ltd., Tokyo, Japan

[21] Appl. No.: 19,600

[22] Filed: Feb. 26, 1987

[30] Foreign Application Priority Data

Feb. 28, 1986 [JP] Japan .................................. 61-41788

[51] Int. Cl.$^4$ .............................................. G21C 15/02
[52] U.S. Cl. .................................................. 376/282
[58] Field of Search ................ 376/225, 234, 282, 353

[56] References Cited

U.S. PATENT DOCUMENTS 3,357,891 12/1967 Wadmark ............................ 376/253
3,816,245 6/1974 Bevilacqua ......................... 376/225
3,976,834 8/1976 Bevilacqua ......................... 376/282
3,977,940 8/1976 Frisch et al. ........................ 376/282

FOREIGN PATENT DOCUMENTS 50-43396 4/1975 Japan .
52-56298 5/1977 Japan .
52-59293 5/1977 Japan .
52-59294 5/1977 Japan .

Primary Examiner—Deborah L. Kyle
Assistant Examiner—Richard W. Wendtland
Attorney, Agent, or Firm—Antonelli, Terry & Wands

[57] ABSTRACT

An emergency reactor core cooling structure comprises a flow passage provided on an upper core plate so as to extend downward therefrom into the core. The flow passage has an orifice member at a lower portion thereof. The orifice member has such a portion that the cross-sectional area of the flow passage is made minimal at the orifice member. The flow passage causes the cooling water held on the upper plate by vapor flowing up on an accident to flow down therethrough, whereby the core is cooled rapidly.

13 Claims, 11 Drawing Sheets

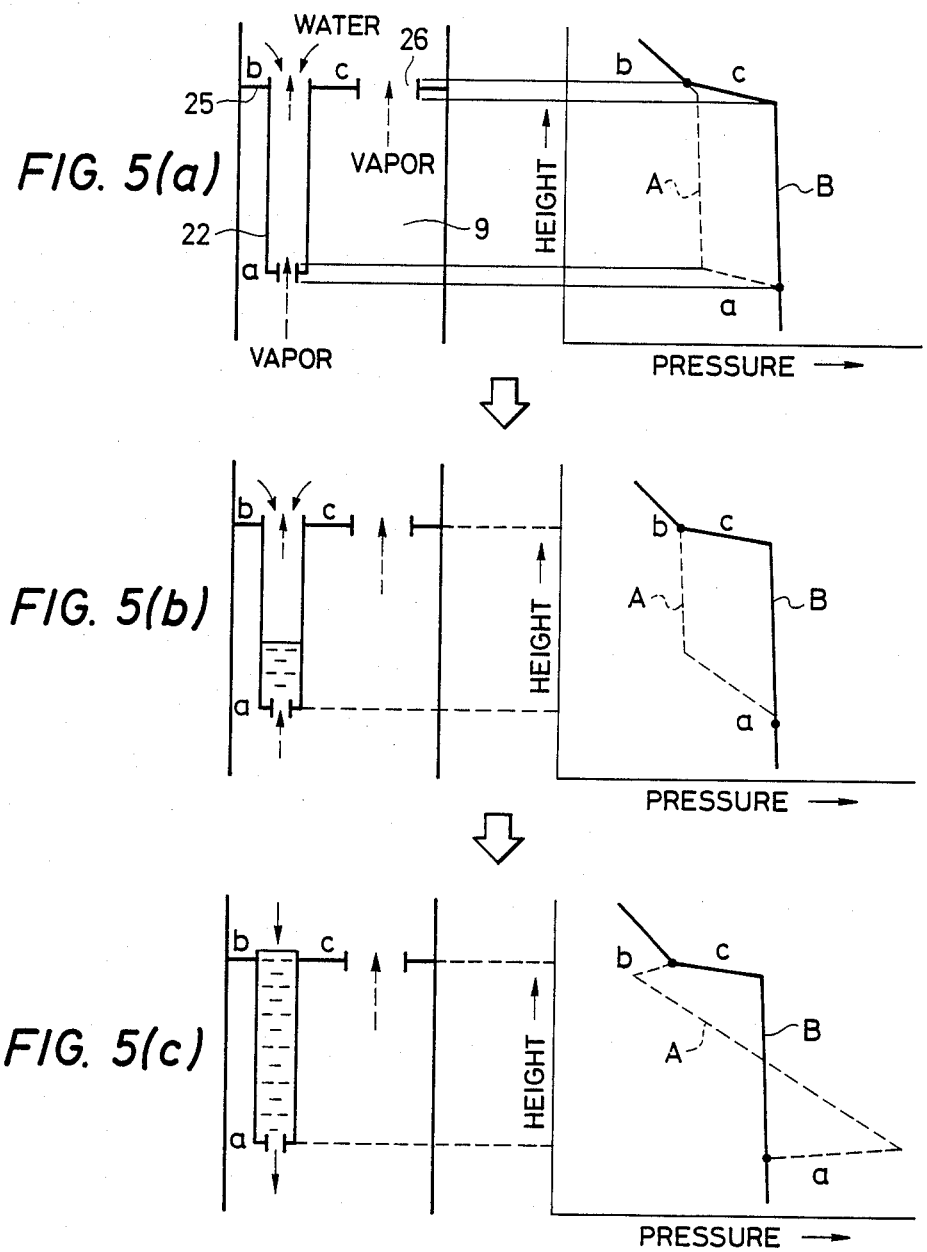

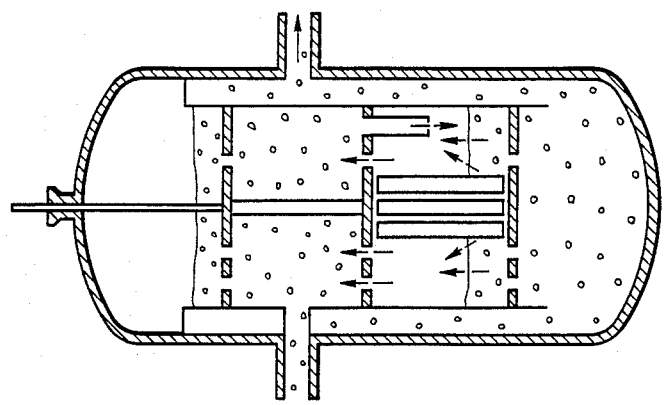
FIG. 12(c) AFTER THE LAPSE OF ABOUT 10 SEC.
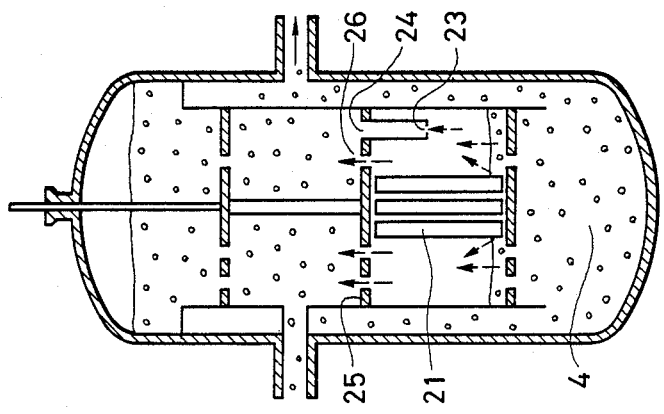
FIG. 12(b) AFTER THE LAPSE OF 3-5 SEC.
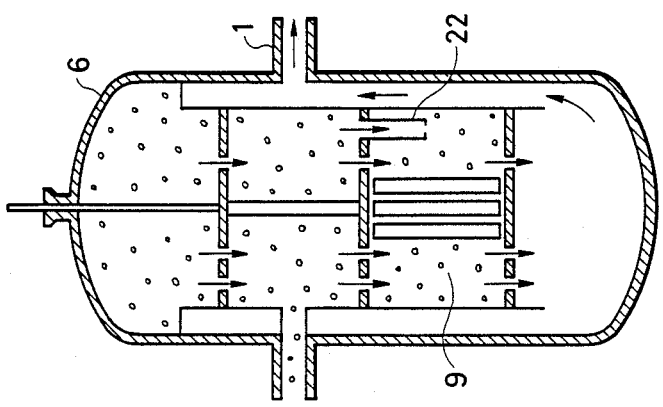
FIG. 12(a) AFTER THE LAPSE OF 0-3 SEC.

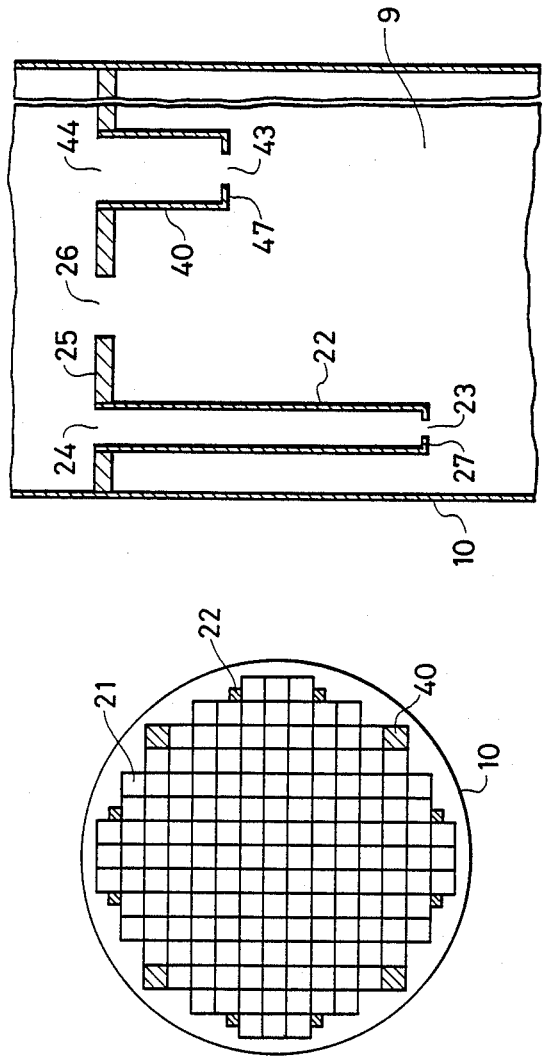

FIG. 16
FIG. 17
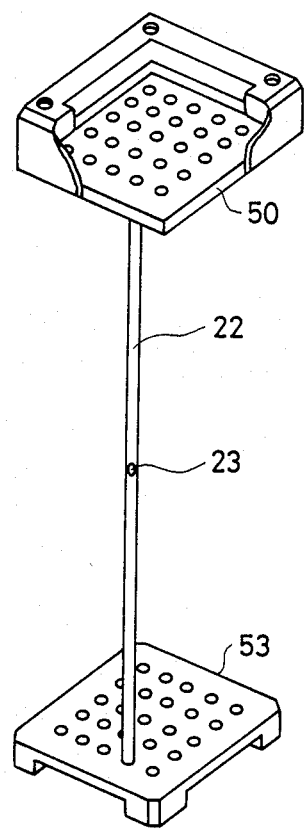
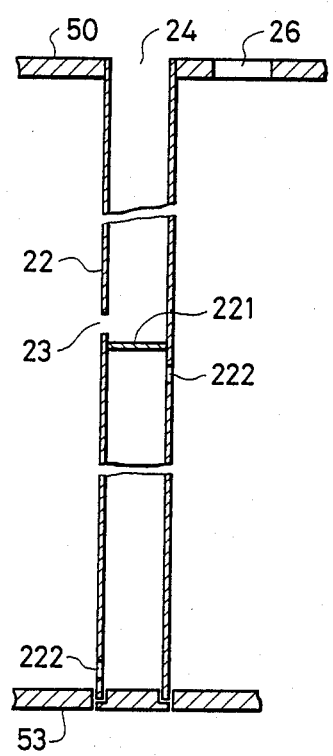

EMERGENCY REACTOR CORE COOLING STRUCTURE

BACKGROUND OF THE INVENTION

This invention relates to an emergency reactor core cooling structure adapted to operate when a coolant is lost due to the breakage of a pipe in a nuclear reactor, and more particularly, to an emergency reactor core cooling structure having a high operational reliability and being suitable for cooling a reactor core.

A conventional pressurized water reactor comprises a pressure vessel, a shroud disposed in the pressure vessel to form a downcomer, a core surrounded by the downcomer and constituted of a lot of fuel assemblies, a lower plenum on the lower side of the core, an upper plenum on the upper side of the core, and cold and hot legs secured to the pressure vessel and communicating with the downcomer and the upper plenum, respectively.

During the normal operation of this nuclear reactor, cooling water driven by a pump flows from the cold leg in the downward direction in the downcomer, and is guided into the core through the lower plenum. The cooling water is heated with the heat from the fuel in the core, and then guided into a steam generator via the upper plenum and the hot leg. The cooling water, the heat of which has been taken in the steam generator, returns to the pump and is driven thereby again into the cold leg. A nuclear reactor in the 1,100,000 kW-class has four such loops.

When a pipe, for example, the cold leg in such a pressurized water reactor is broken, the coolant flows out from a rift, that is, a loss of coolant takes place, so that the water level in the pressure vessel lowers. In order to reduce the quantity of heat generated due to the nuclear fission in the core, control rods are inserted into the fuel assemblies through upper core support columns to cause a scram of the core to occur. Even after the scram of the core has occurred, decay heat is generated in the core, and the water level in the core lowers. Consequently, the fuel assemblies are exposed, and the temperature thereof then increases. The emergency reactor core cooling structure is then operated so that the cooling water is injected from the cold and hot legs into the interior of the pressure vessel to cool the core. During this time, the vapor generated in the core due to the decay heat and the vapor generated in the lower plenum due to the depressurization boiling of the water flow up to an upper core plate partitioning the core and the upper plenum to suppress the falling of the cooling water through bores therein (a CCFL phenomenon). Therefore, a part of the cooling water supplied from the hot leg flows into the loop having a rift, and flows out therefrom. In the meantime, the pressure in the core increases due to the hydrostatic head of the cooling water stored in the upper plenum and a local pressure loss into the core at the upper core plate, and a submergence speed at which the cooling water, injected from the cold leg into the lower plenum through the downcomer flows up in the core is limited.

When such a loss of a coolant occurs in a nuclear reactor provided with a conventional emergency core cooling structure, the cooling water held on the outer side of the pressure vessel is injected into the core through upper control rod guide pipes as described in Japanese Patent Laid-open No. 43396/1975. However, no consideration is given to the effective utilization of the cooling water, which is held on the upper side of the core by the vapor flowing up from the core, for the purpose of cooling the core. A conventional emergency core cooling structure designed to cool the fuel assembly in a boiling water reactor is provided, on the upper side of the core, with a core spray and a cooling water guide pipe which has a funnel type opening opened on the upper side of the fuel assembly and a plurality of openings in the side wall of the same pipe as shown in Japanese Patent Laid-open No. 56298/1977. However, no consideration is given to a counter-current flow limiting phenomenon (CCFL phenomenon) which occurs due to the vapor flowing up in the cooling water guide pipe. Therefore, as shown in Japanese Patent Laid-open Nos. 59293/1977 and 59294/1977 which disclose the provision of a core sprayer on the upper side of the core, and a guide pipe having a plurality of openings in the side wall thereof and an opening at the upper end thereof, each of the cooling water guide pipes in these prior art emergency core cooling structures serves as a pipe for guiding the vapor, which flows from the openings in the side wall thereof into the same pipe, so as to be discharged to the space on the upper side of the fuel assembly through the same guide pipe. Since the flow rate of the vapor flowing out from the vapor guide pipe is limited, so that the guide pipe does not contribute to the decrease in the quantity of vapor flowing up to the upper tie plate on the upper side of the fuel assembly. Namely, the guide pipe has little effect in introducing the cooling water on the upper side of the fuel assembly into the interior thereof. In order that the cooling water on the upper side of the core or fuel assembly is dropped effectively into the core or the interior of the fuel assembly, it is necessary to consider the mutual effects of the vapor flowing up in the interior of the guide pipe and that of the vapor flowing up in the exterior thereof with respect to a counter-current flow limiting phenomenon.

In the above-described conventional emergency core cooling structures, no consideration is given to the techniques for promoting the falling of the cooling water against the counter-current flow limiting phenomenon occurring in the cooling water held on the upper side of the core or fuel assembly by the vapor flowing up from the interior of the core or the fuel assembly. In order to supply cooling water from the outside of the pressure vessel into the interior thereof by a core spray, for example, a means for detecting the breakage of a pipe and a cooling water supply means consisting of some constituent parts, such as a pump and a valve are required. This causes the construction of emergency core cooling structure to be complicated.

SUMMARY OF THE INVENTION

An object of the present invention is to provide an emergency reactor core cooling structure which is capable of effectively cooling a core with cooling water by dropping into the core the cooling water prevented from falling into the core by the steam or vapor flowing up from the core and held on the upper side of the core, thereby to improve the safety of the core when a loss of coolant accident occurs.

Another object of the present invention is to provide an emergency reactor core cooling structure which can cool effectively a core with cooling water suppressed to fall into the core by the steam flowing up from the core, by effectively dropping the cooling water without using any driving means such as a pump and a valve, thereby to provide the reactor with a high operational reliability.

The above objects can be achieved by providing a flow passage which extends downward from the upper side of the core into the interior of the core to communicate the core interior and the cooling water on the upper side of the core and has an inlet for the cooling water opened in the cooling water on the upper side of the core and a discharge port portion at a lower portion thereof, the discharge port portion having a restriction formed for reducing a flow passage area, whereby the steam or vapor flowing up in the core is restricted to enter the discharge port portion of the flow passage, so that the cooling water on the upper side of the core enters the interior of the core thereby to cool the core.

BRIEF DESCRIPTION OF THE DRAWINGS

FIGS. 5(a) to 5(c) are illustrations for explaining states of water and vapor flows in the flow passage and relationships between the height and pressure in the flow passage;

FIGS. 12(a) to 12(c) each are a longitudinal section of the pressurized water reactor FIG. 7 for explaining a fluid flow condition;

FIG. 13 is a schematic plane view of a core according to another embodiment of the present invention;

FIG. 14 is a partial, longitudinal section of the core portion of FIG. 13;

FIG. 16 is another embodiment of the flow passage employed in a fuel assembly;

FIG. 17 is an enlarged sectional view of the flow passage shown in FIG. 16;

DETAILED DESCRIPTION OF THE INVENTION

Figure 1:
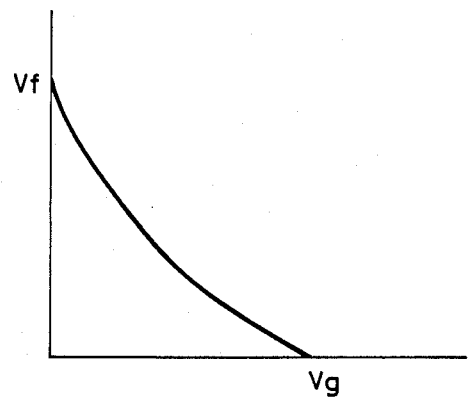
FIG. 1 is a graphical illustration showing a relationship between velocity of flow of water ($V_f$) and velocity of vapor flow ($V_g$)
Figure 2:
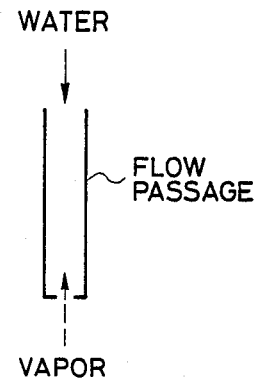
FIG. 2 is an illustration of a flow passage for explaining the relationship shown in FIG. 1.

In general, when vapor flows up in a flow passage as shown in FIG. 2 from a lower portion thereof with water falling from an upper portion thereof, the falling of the water is suppressed at the upper or lower portion of the flow passage due to the vapor flowing up. This phenomenon is called counter-current flow limiting (CCFL), which has such characteristics as shown in FIG. 1, wherein the larger the vapor flow velocity $V_g$ is, the less the water flow velocity $V_f$ is. When the cross-sectional area of the lower portion of the flow passage is set smaller than those of any other portions thereof by providing, for example, an orifice, the velocity of flow of the vapor in the upper portion of the flow passage becomes lower than that of the vapor in the lower portion thereof. This enables the flow rate of the water, which can be introduced into the flow passage from the upper portion thereof, to be set constantly larger than that of the water flowing out from the lower portion thereof.

Figure 4:
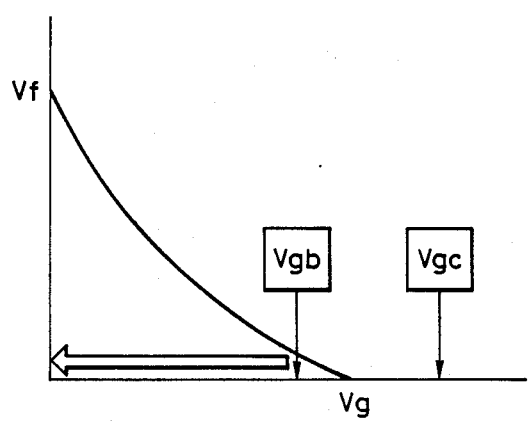
FIG. 4 is a graphical illustration between the water flow velocity ($V_f$) and the vapor flow velocity ($V_g$) in a construction as shown in FIG. 3.
Figure 3:
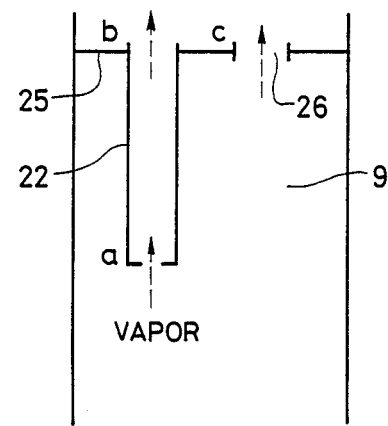
FIG. 3 is an illustration of an example of application of a flow passage to a pressurized water reactor, for explaining a relationship between water flow velocity ($V_f$) and vapor flow velocity ($V_g$)

This phenomenon will be further described in detail, taking a structure of part of a pressurized water reactor, for instance, as illustrated in FIG. 3. The structure comprises a core 9, an upper core plate 25 with a flow port 26, and the above-mentioned type of flow passage 22 secured to the upper core plate and extending therefrom downward into the interior of the core 9. The following explanation is made on the assumption that a cooling water is disposed on the upper core plate 25 and vapor flows up in the core 9. In the FIG. 3, positions a and b indicate the lower and upper portions of the flow passage 22, and a position c the flow prot 26. The velocity of flow of the vapor flowing up in the flow passage is controlled at the position a in which the cross-sectional area of the flow passage is reduced. The velocity of flow of the vapor in the position a is substantially equal to that ($V_gC$) of the vapor in the position c owing to the balanced pressures in two plenums separated from each other by the upper core plate 25. Accordingly, at the position b at which the cross-sectional area of the flow passage is larger than that of the flow passage at the position a, the velocity ($V_gb$) of flow of the vapor decreases in inverse proportion to the cross-sectional area of the flow passage to a level lower than that of the velocity of flow of the vapor at the position c as shown in Fig. 4. Therefore, even when the water cannot fall at the position, c due to the vapor flowing up from the underside thereof, it is possible that the water falls from the position b. The condition of movement of the vapor and water and variations in the pressure distribution in the core after this point in time will be described referring to FIGS. 5(a) to 5(c) wherein a curve A shows pressure in the flow passage 22 and a curve B pressure in the core 9. In the flow passage 22 under the conditions as shown in FIG. 5(a), the water flows from the upper side thereinto. The flow rate of the water flowing into the flow passage 22 from the upper side thereof is higher than that of the water flowing out from the lower side thereof, so that the water is accumulated in the flow passage 22, as shown in FIG. 5(b). As the water is accumulated in the flow passage 22, the fluid resistance increases, and the velocity of flow of the vapor flowing up in the flow passage 22 decreases. When the velocity of flow of the vapor flowing up from the lower side decreases, the flow rate of the water which can flow into the flow passage 22 from the upper side increases, so that the water is accumulated in the passage 22 in an accelerated manner. Finally, the flow passage 22 is filled with the water to attain the pressure distribution shown in FIG. 5(c). If the length of the flow passage 22 is set selectively so that the pressure in the flow passage 22 filled with the water around the position a becomes higher than that in the core 9, the water falls continuously in the flow passage 22. The flow rate of this water is determined depending upon a pressure difference and fluid resistance in the position a. According to the present invention, the water can thus fall continuously through the flow passage fixed to the structure provided at the upper side of the core even when the water cannot fall from the flow port 26 formed in this structure, due to the vapor flowing up from the underside of the flow passage. Therefore, the cooling water, which is held on the upper side of the core in case of a nuclear reactor having a conventional emergency core cooling structure, can be utilized effectively for the cooling of the core, and the safety of the core at the time of occurrence of a loss of the coolant can be further improved. Since an amount of the cooling water held on the upper side of the core decreases, the vapor in the core flows out easily. This promotes the reduction of the core pressure, so that the cooling water flows easily into the core.

Figure 6:
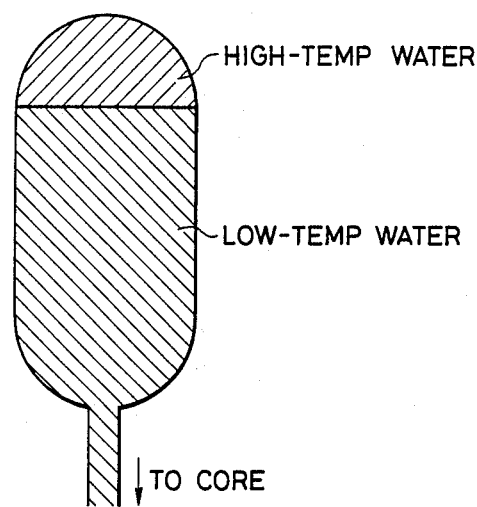
FIG. 6 is a schematic sectional view of a water storage tank storing low temperature water and high temperature water.

It is also effective to provide a water storage tank in which the low-temperature water and high-temperature water are stored, as shown in FIG. 6, and a water injection pipe for guiding the low-temperature water into the core.

By providing the reactor with such an arrangement, when the coolant is discharged to the outside of the core by an accident of a loss of coolant in a nuclear reactor, so that the pressure in the core decreases, and then the pressure in the pressure vessel has reached the level of a saturation pressure of the high-temperature water in the water storage tank, the high-temperature water in the tank starts to boil. Owing to the volume expansion due to boiling of the high-temperature water, which is caused by this depressurization boiling thereof, the low-temperature water is injected into the core. In a conventional pressure-accumulated type water injection system, a pressurized gas is used instead of the high-temperature water. In this construction, the same waterinjecting force as in such a conventional water injection system can be obtained by using high-temperature water the volume of which is 1/4–1/5 of the pressurized gas. Accordingly, the operational reliability of the present invention increases without any driving means, such as a valve and a pump.

An embodiment of the present invention will now be described, referring to FIG. 7.

Figure 7:
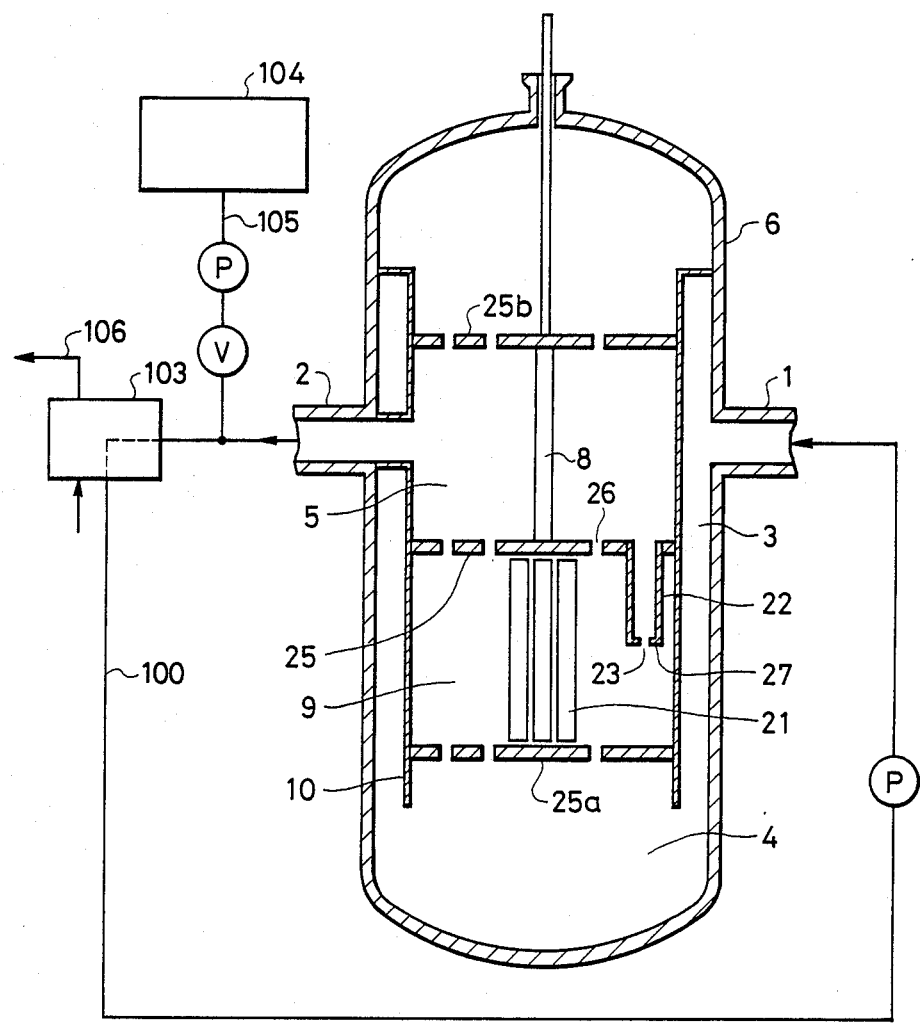
FIG. 7 is a longitudinal section of a pressurized water reactor showing an embodiment of an emergency core cooling structure according to the present invention.

In FIG. 7 showing a pressurized water reactor provided with an emergency core cooling structure, the reactor comprises a pressure vessel 6, a shroud 10 disposed in and secured to the pressure vessel 6 at an upper portion thereof to form a downcomer 3, a core 9 defined by upper and lower core plates 25, 25a and the shroud 10 and having a plurality of (about 200) fuel assemblies 21, and a lower plenum 4 defined on the lower side of the core by the lower core plate 25a, an upper plenum 5 defined on the upper side of the core by the upper core plate 25. In the upper plenum 5, a plurality of control rod guide pipes 8 (only one shown in FIG. 7) are disposed and supported by a support plate 25b secured to the shroud 10. The pressure vessel 6 is provided with a cold leg 1 and a hot leg 2. The hot leg 2 communicates with the cold leg 1 through a piping 100 on which a steam generator 103 and a pump are provided. Thus, a liquid flow loop is formed. This type of reactor is provided with four such cooling water circulation lines.

In the normal operation of the reactor, the cooling water enters the pressure vessel 6 at the cold leg 1, and it is introduced into the core 9 through the downcomer 3 and the lower plenum 4. The cooling water is heated in the core 9 and then enters the upper plenum 5. The heated cooling water is introduced into the steam generator 103 through the hot leg 2. The heated cooling water is cooled there to generate steam 106 through heat exchange. The cooled cooling water is fed to the cold leg 1 by the pump through the circulation line 100. In case where any one of the cooling water circulation lines is broken, cooling water is supplied to the core from a water source 104 through a line 105 with a pump and a valve.

Figure 8:
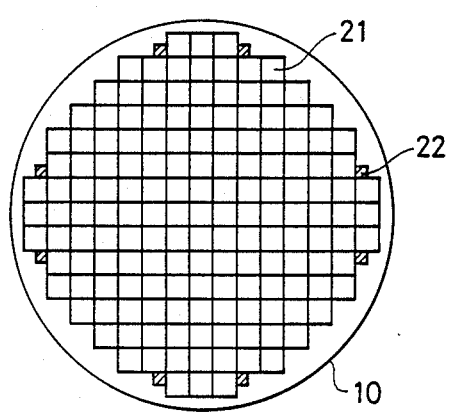
FIG. 8 is a schematic plane of a core shown in FIG. 7.
Figure 11A:
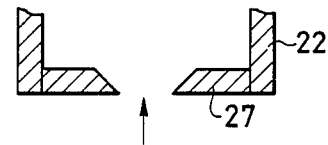
FIGS. 11(a) and 11(b) each are an enlarged partial section of the flow passage showing an example of an orifice shape of the flow passage.
Figure 11B:
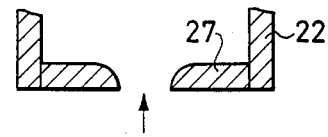

In this embodiment, flow passages 22 are added to the outermost peripheral portion of the core 9 made of the plurality of fuel assemblies 21, and each of the flow passages 22 made of a tubular member such as a tube is fixed to the upper core plate 25 so as to extend vertically therefrom into the core 9. Since the flow passages 22 are provided in a space between the outermost fuel assemblies 21 and the shroud 10 as shown in FIG. 8, the dimensions of the shroud 10 may not be changed. The each flow passage 22 is provided at its lower portion with, for example, an orifice member with a port or orifice 23 for the purpose of minimizing the cross-sectional area of this portion of the flow passage 22. The orifice member 27, which makes the cross-sectional area of the lower portion of the flow passage 22 minimum as compared with those of the remaining portions thereof, can be substituted by a nozzle and a venturi. As referred to in the description of the illustration in FIG. 5, it is necessary that the length of the flow passage 22 be determined selectively so that the pressure at the lower end of the interior of the flow passage 22 becomes higher that that in the core 9 when the flow passage 22 is filled with water. A minimum length of the flow passage 22 determined on the basis of such conditions becomes 0.08L, wherein L is a distance between the upper core plate 25 of the lower end of the fuel assembly 21. Accordingly, when the length of the flow passage 22 is set to not less than 0.08L, the water in the flow passage 22 falls continuously. Since a pressure difference at the orifice member 27 increases in proportion to the set length of the flow passage 22, the velocity of flow of the falling water increases. In order to effectively cool the core 9 by dropping the cooling water, which is held on the upper side of the upper core plate 25 into the core 9, it is desirable to increase the water level again quickly up to the vertically intermediate portions, at which the output density is the highest, of the fuel assemblies 21. Accordingly, the length of the flow passage 22 is preferably 0.08L–0.5L. If the cross-sectional area of the orifice or port 23 is the smallest as compared with those of any other portions of the flow passage 22, the present invention works effectively. As may be understood from FIGS. 3 and 4, the smaller the ratio R, which is obtained by dividing the cross-sectional area of the flow passage portion 23 in the orifice member 27 by that of the flow passage portion at the upper end of the flow passage 22, becomes, the larger the upper limit of the velocity of flow of vapor, at which the present invention works effectively, becomes. Namely, the velocity of flow of vapor at the flow ports 26 in the upper core plate 25 at a point in time at which the velocity of flow of vapor at the upper end 24 of the flow passage 22 becomes $V_{go}$, which represents a velocity of flow of vapor at such a time that the vapor falling up causes the water to be unable to fall, becomes $V_{go}/R$, the value of $V_{go}/R$ becoming larger as the value of R decreases. The cross-sectional area of the flow port 26 should be set sufficiently larger than a total cross-sectional area of the upper ends 24 of the flow passages 22. In the case where the flow rate of vapor flowing up when an accident occurs becomes higher than in an ordinary plant due to, for example, an increase in the output density in the core, the value of R is reduced correspondingly. Consequently, the water can be dropped continuously in the flow passage 22 irrespective of an increase in the flow rate of the vapor. In view of the flow rate of the vapor flowing up to the upper core plate 25 when an accident occurs, the range of the value of R is preferably between 0.25 and 0.85. The orifice member 27 is preferably tapered at the port 23 as shown in FIG. 11(a) or formed like a Lavel nozzle as shown in FIG. 11(b) so that the flow passage in the orifice member 27 is divergent in the direction in which the vapor flows forward as shown in FIGS. 11(a) and 11(b), for the purpose of increasing the fluid resistance against the forward flow of vapor and decreasing the fluid resistance against a backward flow thereof. The orifice may be formed so as to extend not downward but sideways.

This embodiment is provided with eight of the flow passages 22, each of which has the orifice the cross-sectional area of which is 71% of that of the upper end 24 of the flow passage 22, the length of the flow passage 22 being 0.38L, the cross-sectional area of the flow passage 22 being 40% of one fuel assembly 21. During a normal operation of such a pressurized water reactor, the water driven by the pump flows from the lower plenum 4 into the core 9. A part of the cooling water flowing into the core 9 flows into the flow passage 22 fixed to the upper core plate 25. Therefore, in order to send the cooling water to the core constituted of the fuel assemblies 21 at such a flow rate that is equal to that at which the cooling water is sent to the same position in the same reactor vessel which has not yet been provided with such a flow passage 22, it is necessary to increase the capacity of the pump but the percentage at which the capacity of the pump requires to be increased is only 2% at the highest.

Let us assume that a loss of coolant occurs in such a pressurized water reactor due to the breakage of a pipe therein, for example, the cold leg 1. The change in the movements of the fluids in the core 9 in such a case will now be described with reference to FIGS. 12(a) to 12(c). When the breakage of a pipe occurs, the cooling water flows out from a rift, so that the pressure in the pressure vessel 6 decreases. Immediately after the occurrence of the breakage of the pipe (FIG. 12(a)), the high-temperature water is held on the upper side of the core 9, and the low-temperature water (sub-cooled of about 25° C.) on the lower side thereof. The cooling water flows down in the core by expansion force generated due to the depressurization boiling of the high-temperature water. When about three seconds have elapsed after the occurrence of the breakage of a pipe, the temperature of the cooling water in the lower plenum 4 also reaches a level of saturation, and flashing or depressurization boiling of this cooling water starts. The vapor generated in the lower plenum 4 due to the depressurization-boiling of the cooling water and the vapor generated due to the heat occurring in the core flow up to the flow ports 26 in the upper core plate 25, and the water is prevented from falling into the core through the flow ports 26, so that a water level is formed in the core 9 about five seconds after the occurrence of the breakage of a pipe, and the greater parts of the fuel assemblies 21 are exposed to the vapor (FIG. 12(b)). In this embodiment, the velocity of flow of the vapor flowing up through the upper flow port 24 of the flow passage 22 is 71% of that of the vapor flowing up through the flow port 26 since the flow rate of vapor is controlled at the flow passage lower port 23 which has the smallest cross-sectional area. Therefore, even when the velocity of flow of the vapor flowing up through the flow port 26 is higher than the level at which the water cannot flow thereinto, the water can flow into the upper flow port 24 as shown in the diagram of CCFL characteristics of FIG. 4, wherein $V_g b$ and $V_g c$ denote the velocities of the vapor at the flow port 24 and at the flow port 26, respectively, and the $V_g b$ changes as shown by an arrow as the water is stored in the flow passage 22. In such a case, the water comes to fall continuously through the flow passage 22 about 10 seconds after the breakage of a pipe as shown in FIG. 12(c), owing to the mechanism referred to in the description of FIG. 5. The velocity of flow, which is calculated on the basis of the balance between the pressure in the flow passage 22 and that in the core 9, of the water at the lower flow port 23 during this time is 4.9 m/s. The water falling from the lower flow port 23 flows up from the underside of the core 9 as it cools the fuel assemblies. An increase in the speed (re-submergence speed) Vr, which corresponds to the additional provision of the flow passage 22, of the water during this time can be expressed by the following equation on the assumption that the water contains no vapor phase.

$$Vr = 4.9 \times S_1/S_0 \text{ (m/s)} \qquad (1)$$

wherein $S_1$ is a total cross-sectional area (m²) of the lower flow port 23 of the flow passage 22; and $S_0$ a cross-sectional area (m²) of the portion of the core 9 in which the fluids flow.

In this embodiment, $S_1/S_0$ is 0.012, and the core re-submergence speed increases by at least 5.9 cm/s. Even when the number of the flow passages 22 is increased with the cross-sectional area of each of the flow passages 22 reduced correspondingly, the same effect can also be obtained. According to this embodiment, the cooling water held on the upper core plate 25 falls speedily into the core 9, so that the vapor generated in the core 9 escapes easily in the upward direction to cause a decrease in the pressure therein. Consequently, due to the balanced pressures in the downcomer 3 and core 9, the water injected from a cold leg 1 in a sound state flows easily from the downcomer 3 into the core 9 through the lower plenum 4. Since the cooling water held on the upper side of the upper core plate 25 can be utilized effectively in this embodiment from a point in time which is immediately after the occurrence of an accident, a single-phase cooling mode, i.e. a vapor-phase cooling mode can be changed speedily to a two-phase cooling mode, i.e. a gas-liquid-phase cooling mode. This enables the cooling characteristics of fuel claddings of fuel rods to be improved. When the distance between the adjacent fuel rods is reduced to increase the density and minimize th dimensions of the core 9, the output density of the core 9 increases, and the cross-sectional area of the flow port 26 decreases. This makes it more difficult to cause the cooling water at the upper core plate 25 to fall. However, if the cross-sectional area the port 23 of the orifice 27 is further reduce to decrease the velocity of vapor at the upper flow port 24, the cooling water on the upper side of the upper core plate 25 can be dropped through the flow passage 22. If the ratio of the cross-sectional area of the lower port 23 to that of the upper flow port 24 of the flow passage 22 is thus determined properly the emergency core cooling structure can be operated properly in compliance with any degree of variations in the core output. According to this embodiment, the core re-submerging speed can be increased by at least 5.9 cm/s by merely adding flow passages to the circumferential portion of the core, and the fuel cladding cooling characteristics can be improved immediately after the occurrence of an accident.

Another embodiment of the present invention is shown in FIGS. 13 and 14. The characteristics of this embodiment reside in that short flow passages 40 are added to the above-mentioned embodiments and the other construction is the same as the previous embodiment. This embodiment is provided with four short flow passages 40, each of which has an orifice member 47 having a flow port 43 the cross-sectional area of which is set to 71% of that of the upper end flow port 44 of the flow passage 40. The length of the flow passage 40 is set to 0.15L, wherein L is a distance between an upper core plate 25 and the lower end of a fuel assembly 21. The cross-sectional area of the flow passage 40 is set 1.6 times as large as that of each fuel assembly 21. During a normal operation of such a pressurized water reactor, the water driven by a pump flows from the lower plenum into the core 9. A port of the water which has flowed into the core 9 enters the flow passages 22, 40. Therefore, in order to send the cooling water toward the fuel assemblies 21 at such a flow rate that is equal to that in the same nuclear reactor which has not yet been provided with the flow passages 22, 40, it is necessary to increase the capacity of the pump but the percentage at which capacity of the pump requires to be increased is only 6%. When a loss of coolant occurs due to the breakage of, for example, the cold leg 1 shown in FIG. 7, in such a pressurized water reactor, the vapor generated due to the depressurization boiling in the lower plenum 4 and the generation of heat in the core 9 flows up through the flow port 26 in the upper core plate 25, and the water which has flowed from the core 9 due to the entrainment (carrying action) of the vapor, the water injected from the hot leg into the upper plenum, or a part of the water held in the upper portion of the core 9 at the time of occurrence of an accident are retained on the upper side of the upper core plate 25. According to this embodiment, the flow passages 22, 40 are added to the upper core plate 25, and orifice members 27, 47 are provided at the lower portions of the flow passages so that the cross-sectional areas of the lower ports 22, 23 43 of the flow passages 22, 40 become smaller than those of any other portions thereof. Accordingly, as referred to in the description of the previous embodiment, the water can fall continuously through the flow passages 22, 40 even when the water cannot fall into the flow port 26 of the upper core plate 25. An increase in the core re-submerging speed, which occurs due to the addition of the flow passage 22, is 5.9 cm/s as referred to in the description of a previous embodiment. The velocity of flow of the water at the lower portion 43, which is calculated by taking the balance of pressures in the flow passage 44 and core 9 into consideration, is 2.3 m/s. A value (R) obtained by dividing a total cross-sectional area of the passages at the lower portion 43 of the flow passages 40 by the cross-sectional area of the flow passage portion of the core 9 is 0.024 in this embodiment, and the core re-submerging speed, which occurs due to the addition of the flow passage 40 increases by 5.5 cm/s. Accordingly, in this embodiment, the core re-submerging speed increases by 11.4 cm/s while the water level increases up to the lower end 23 of the flow passage 22 after the core has been exposed to the vapor, and by 5.5 cm/s while the water level increases up to the lower end of the flow passage 40 thereafter. If flow passages having a length larger than 0.5L are further added, the speed at which the water level increases up to the lower end of this flow passage can be further increased. According to this embodiment, the core re-submerging speed increases 5.5–11.4 cm/s when only flow passages are added to the circumferential portion of the core. This enables the water level to increase speedily up to the upper portion of the core, and the cooling characteristics of the fuel cladding to improve immediately after the occurrence of an accident.

Figure 15:
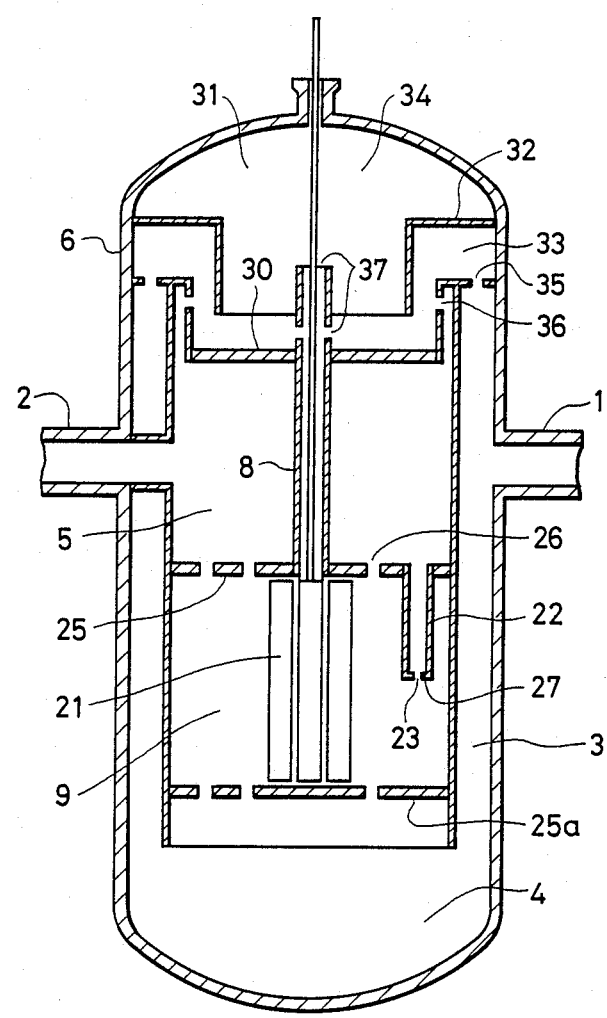
FIG. 15 is a longitudinal sectional of a pressurized water reactor showing another embodiment of the emergency core cooling structure of the present invention.

Further another embodiment of the present invention is shown in FIG. 15. The characteristics of this embodiment reside in that it is made by modifying the embodiment of FIG. 7 by forming a water storage tank 31 in a pressure vessel 6 by an upper core support plate 30, and dividing the water storage tank 31 into a high-temperature water storage space 33 and a low-temperature water storage tank 34 by a partition 32. During a normal operation of the nuclear reactor, the high-temperature cooling water (about 290° C.) flows from a cold leg 1 into the high-temperature water storage space 33 through a leakage bore 35, and into an upper plenum 5 through a leakage bore 36. On the other hand, in the low-temperature water storage space 34, the temperature of the cooling water is in a low level (about 160° C.) due to the radiation of heat. A flow passage 22 is added to an upper core plate 25 in the same manner as in the embodiment of FIG. 7, and an orifice 27 is provided in the lower portion of the flow passage. When a loss of coolant occurs in such a pressurized water reactor due to the breakage of a pipe, for example, the cold leg 1, the vapor generated due to the depressurization boiling occurring in a lower plenum 4 and due to the heat generated in a core 9 flows up through a flow port 26 in the upper core plate 25, and the water flowing up from the core 9 due to the entrainment of vapor, the water injected from the hot leg 2 into the upper plenum 5, or a part of the water held in the upper portion of the core 9 at the time of the occurrence of the accident are retained on the upper side of the upper core plate 25. In this embodiment, the flow passage 22 is fixed to the upper core plate 25, and the orifice member 27 with a lower port 23 is provided at the lower portion of the flow passage 22 so that the cross-sectional area of the passage becomes the smallest at the lower portion. Therefore, even when the water cannot fall through the flow port 26 in the upper core plate 25, the water falls continuously through the flow passage 22, and the core re-submerging speed increases by at least 5.9 cm/s, as referred to in the description of a previous embodiment. The cooling water does not flow into a rift-carrying loop through bypassing sound loops, so that the emergency core cooling system being actually operated can be effectively utilized. When the water level in the core 9 lowers, so that the core 9 is exposed, the cooling water starts flowing into the core 9 through the flow passage 22. Therefore, the flow passage 22 displays its effect markedly during a high core-output period which is immediately after the occurrence of exposure of the core 9. When the pressure in the pressure vessel 6 decreases to a level which is lower than 65 atm., i.e. a saturation pressure at 290° C., the temperature of the high-temperature cooling water in the high-temperature water storage space 33, the high-temperature cooling water accumulated in the space 33 is depressurization-boiled, so that the volume of this cooling water increases. Due to the volume expansion force of this cooling water, the low-temperature cooling water held in the low-temperature water storage space 34 is supplied from leakage bores 37 into the upper portions of fuel assemblies 21 through control rod guide pipes 8 to cool the fuel assemblies 21. This core cooling effect produced by utilizing the volume expansion force mentioned above is displayed markedly, especially, between the time at which the whole of the cooling water in the upper plenum 5 finishes falling into the core 9 through the flow passage 22 and the time at which the core 9 is thereafter re-submerged. According to the present embodiment, the cooling water held on the upper side of the upper core plate 25 can be utilized effectively during a high core-output period which is immediately after the occurrence of exposure of the core, and the expansion force generated due to the depressurization-boiling of the high-temperature cooling water is thereafter utilized as a driving power source to supply the low-temperature cooling water directly into the core. This enables the core-cooling characteristics and reliability of the present invention to be improved.

The water storage tank 31, which is provided in the pressure vessel 6 in this embodiment, may be provided on the outer side thereof so as to supply the cooling water into the core 9 through the hot leg 2 or cold leg 1. In such a case, the high-temperature water can be produced by heating a part of the water in the storage tank by a heater.

A further embodiment of the present invention will now be described with reference to FIGS. 16 and 17 showing the interior of a fuel assembly 21. In a pressurized water reactor having an electric output in the 1,100,000 kW-class, about 200 fuel assemblies are provided, and control rods are not inserted in 75% of these fuel assemblies. In this embodiment, the control rod guide pipes of fuel assemblies of 18%, of a total fuel assemblies in which control rods are not inserted are used as flow passages 22. Each flow passage 22 is provided with an upper flow port 24 and a lower port 23 thereof to form a passage by which the space above an upper nozzle 50 and the interior of the corresponding fuel assembly are communicated with each other. A partition 221 is provided in the flow passage 22 and the lower portion has holes 222 for circulating the cooling water. For example, in a core having fuel assemblies in 17×17 arrangement, 24 control rod guide pipes are provided per one fuel assembly. In the most preferred aspect of this embodiment, the lower slow port 23 is provided at the portion of the flow passage 22 which is 0.4L, wherein L is the length of the flow passage 22, away from the upper end thereof, and the cross-sectional area of this lower flow port 23 is 83% of the flow passage 22. When a loss of a coolant occurs in a pressurized water reactor having such fuel assemblies, due to the breakage of a pipe, for example, the cold leg 1 as shown in FIG. 15, the vapor generated due to the depressurization-boiling of the cooling water and due to the heat generated in the core flows up through the flow port 26 in the upper nozzle 50, and the water which has flowed up from the core by the entrainment of the vapor, the water injected into the hot leg or a part of the water held in the space above the core at the time of occurrence of the accident are retained in the space above the upper nozzle 50. Since the velocity of flow of vapor flowing up through the upper flow port 24 is controlled by the lower flow port 23 having the smallest cross section, this velocity of flow becomes lower than that of the vapor flowing up through the flow port 26. Therefore, even when the velocity of flow of the vapor flowing up through the flow port 26 is higher than the level at which the water cannot flow thereinto, the water can flow into the upper flow port 24 as shown in the diagram of CCFL characteristics of FIG. 4. Consequently, the water falls continuously from the flow port 23 through the flow passage 22 by the mechanism illustrated in FIG. 5. The velocity of flow, which is calculated on the basis of the balance between the pressures in the flow passage 22 and that in the core, of the water at the lower flow port 23 during this time is 4.9 m/s. According to this embodiment, the value obtained by dividing a total cross-sectional area of the lower flow ports 23 of the flow passages 22 by a cross-sectional area of a flow passage portion of the core is 0.01, and the velocity of flow of the water which contributes to the core-re-submerging speed is 4.9 cm/s. In this embodiment, the cooling water held above the upper nozzle 50 can be introduced into the central, in which the output density is the highest, of the fuel assemblies immediately after the occurrence of an accident, the cooling characteristics of the fuel claddings can be improved. According to this embodiment, which is capable of increasing the core-resubmerging speed by 4.9 cm/s, and introducing the cooling water into the central portion, in which the output density is the highest, of the fuel assemblies immediately after the occurrence of an accident, the cooling characteristics of the fuel claddings can also be improved.

Figure 18:
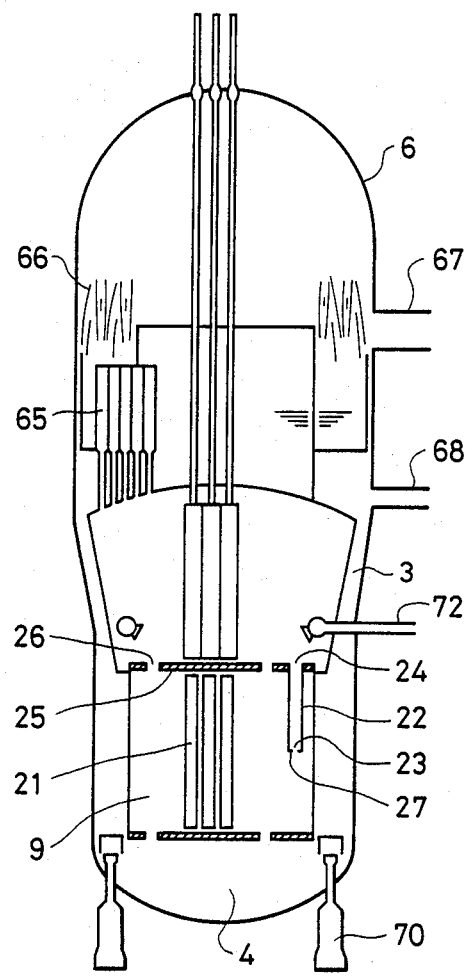
FIG. 18 is a longitudinal section of a BWR showing another embodiment of the present invention.

A further embodiment of the present invention is shown in FIG. 18. This embodiment is applied to a boiling water reactor having a dense core in which fuel rods are arranged at short intervals. In this embodiment, fuel passages 22 are added in the outermost positions in the core 9 containing a plurality of fuel assemblies 21, the fuel passages 22 being fixed to an upper core plate 25. An orifice member 27 with a lower port 23 is provided at the lower portion of each flow passage 22 so that the cross-sectional area of the lower port 23 becomes smaller than those of any other portions of the flow passage 22. In a preferably mode of this embodiment, the cross-sectional area of the lower port is set to 71% of that of a upper flow port 24 of the flow passage 22, and the length of the flow passage 22 to 0.38L wherein L is the distance between the upper core plate 25 and the lower end of a fuel assembly 21, a total cross-sectional area of the flow passages 22 being set 3.2 times as large as that of a flow passage portion of one fuel assembly 21. During a normal operation of the nuclear reactor, the cooling water is heated and boiled with the heat from the plurality of fuel assemblies 21 in the core 9. The vapor generated is subjected to gas-water separation in a separator 65, and the resultant gas is dried in a drier 66 and then sent to a turbine (not shown) through a main vapor pipe 67. The vapor is turned into water in a condenser (not shown). The resultant water is driven by a pump to be returned to a downcomer 3 through a water feed pipe 68. The cooling water returned to the downcomer 3 is driven by an internal pump 70, and flows into the core 9 through a lower plenum 4. When a pipe, for example, the water feed pipe 68 is broken in such a boiling water reactor, the water level in a pressure vessel 6 decreases as the cooling water flows out. After the water level has reached the height of the water feed pipe 68, the vapor is discharged but, due to the depressurization boiling of the cooling water, the cooling water continues to be lost, so that the water level continues to lower. In order to supply cooling water into the core 9, the cooling water is then scattered in the space above the upper core plate 25 through a core spray pipe 72. The cooling water is not directly supplied to the core 9 taking the thermal stress in the fuel claddings into consideration. If the cooling water is scattered in the space above the upper core plate 25, the water is mixed with vapor, so that the temperature of the cooling water increases to a level near the saturation temperature thereof. Therefore, the thermal stress in the fuel claddings can be reduced to a sufficiently low level. However, when the cooling water is scattered in the space above the upper core plate 25, the vapor generated due to the depressurization boiling of the cooling water and due to the heat generated in the core flows up through a flow port 26 in the upper core plate 25 to suppress the falling of the cooling water. In this embodiment, the velocity of flow of the vapor flowing up through the upper flow port 24 of the flow passage 22 is controlled by the lower flow port 23 the cross-sectional area of which is smaller than those of any other portions of the flow passage 22, so that this velocity of flow becomes lower than that of the vapor flowing up through the flow port 26 provided in the upper core plate 25. Accordingly, even when the velocity of flow of the vapor flowing up through the flow port 26 is higher than a level at which the water becomes unable to flow into the core, the water flows thereinto from the upper flow port 25 of the flow passage 22 against the CCFL characteristics illustrated in FIG. 4. Thus, owing to the mechanism illustrated in FIG. 5, the water falls continuously through the flow passage 22. In this embodiment, the velocity of flow, which is calculated on the basis of the balance between the pressures in the flow passage 22 and that in the core 9, of the water at the lower flow port 23 of the flow passage 22 is 5.3 m/s. In this embodiment, the value obtained by dividing a total cross-sectional area of the lower flow ports 23 of the flow passages 22 by a cross-sectional area of a flow passage portion of the core is 0.012, and the portion of the velocity of flow of the water by which the present invention contributes to the core resubmerging speed is at least 6.4 cm/s. According to this embodiment, the cooling water is introduced into the core after it has been heated to a temperature in the vicinity of the saturation temperature thereof. This enables the thermal stress in the fuel claddings to be reduced to a sufficiently low level, and the core re-submerging speed to increase by at least 645 cm/s.

Figure 9:
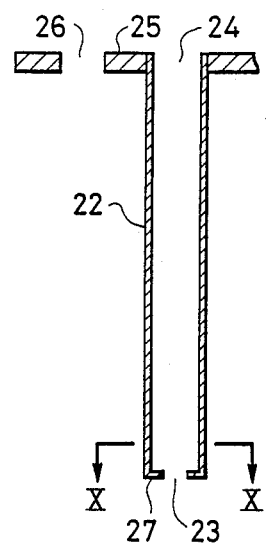
FIG. 9 is an enlarged longitudinal section of a flow passage illustrated in FIG. 7.
Figure 10:
FIG. 10 is a section of the flow passage taken along a line X—X of FIG. 9.
Figure 19A:
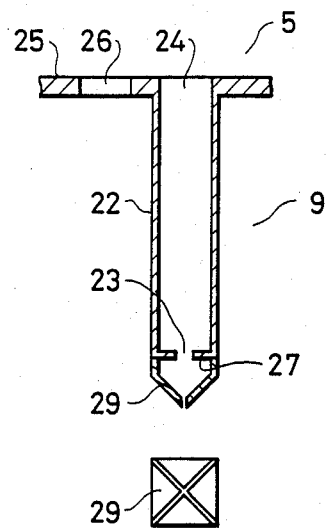
FIGS. 19(a) and 19(b) are sectional views of another embodiment of a flow passage according to the present invention.
Figure 19B:
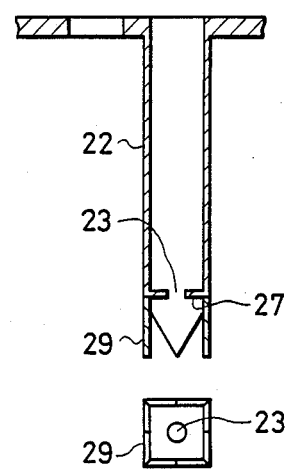

A further embodiment of the present invention is shown in FIGS. 19(a) and 19(b). This embodiment is made by modifying the flow passage 22 shown in FIG. 9 by providing shielding plates 29 formed of a shape memory alloy at the lower portion of the flow passage 22. These shielding plates 29 are closed as shown in FIG. 19(a) during a normal operation (the temperature of the coolant is about 290° C.) of the nuclear reactor. Accordingly, the flow rate of the cooling water flowing through the flow passage 22 during a normal operation of the nuclear reactor becomes substantially zero, so that it is unnecessary to increase the capacity of the pump for use in compensating for the cooling water flowing out from the flow passage 22. On the other hand, when a loss of the coolant occurs, so that the temperature of the cooling water decreases due to the decrease in the pressure in the pressure vessel. When the temperature of the cooling water thus decreases to, for example, not higher than 250° C., the shielding plates 29 are opened as shown in FIG. 19(b). When the shielding plates 29 are opened, the flow rate of the vapor flowing up through the flow passage 22 is restricted by an orifice plate 27 having a flow port 23, of the flow passage 22 even under the conditions which prevent the cooling water in the upper plenum 5 from falling from the flow port 26 in the upper core plate 25 into the core 9. Consequently, the velocity of flow of vapor in the upper portion 24 of the flow passage 22 decreases, and the cooling water in the upper plenum 5 falls effectively into the core 9 through the flow passage 22. The present invention is capable of preventing an increase in the capacity of the pump used during a normal operation of a nuclear reactor, promoting the advancement of the cooling water into the core when a loss of the coolant occurs, and improving the cooling capacity of the fuel claddings.

Figure 20A:
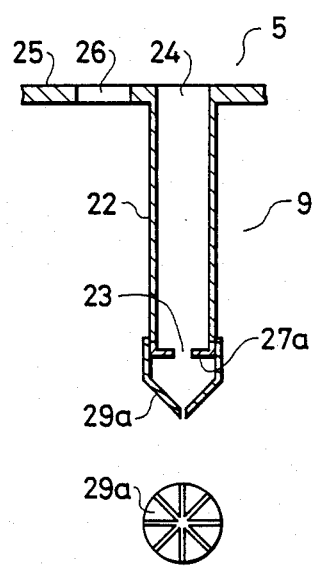
FIGS. 20(a) to 20(c) are sectional views of another embodiment of a flow passage according to the present invention.
Figure 20B:
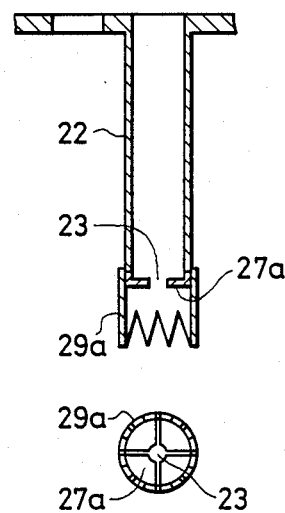
Figure 20C:
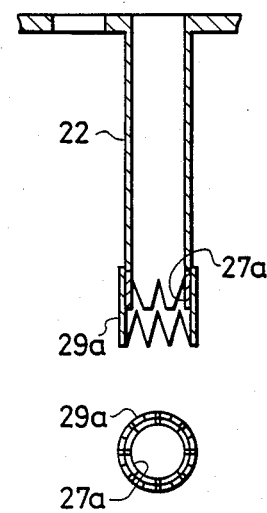

A further embodiment of the present invention is shown in FIGS. 20(a) to 20(c). This embodiment is made by modifying the embodiment of FIG. 19 by forming an orifice plate 27a with a port 23 of a shape memory alloy. During a normal operation of the nuclear reactor, shielding plates 29a made of a shape memory alloy are closed as shown in FIG. 20(a). When a loss of the coolant occurs, the shielding plates 29a are opened due to a decrease in the temperature of the cooling water as shown in FIG. 20(b). When the cooling water in the upper plenum 5 starts flowing into the core 9 through the flow passage 22, this flow passage 22 is filled with the cooling water, so that the fluid resistance increases, whereby the vapor does not flow from the core 9 into the flow passage 22. Accordingly, when the cooling water in the upper plenum 5 falls into the core 9 through the flow passage 22 with the orifice plate 27a cooled with the cooling water to, for example, not higher than 200° C., the orifice plate 27a is opened as shown in FIG. 20(c), to promote the falling of the cooling water. This embodiment is capable of preventing the capacity of a pump used during a normal operation of a nuclear reactor, and promoting the advancement of the cooling water into the core when a loss of coolant occurs.

Figure 22:
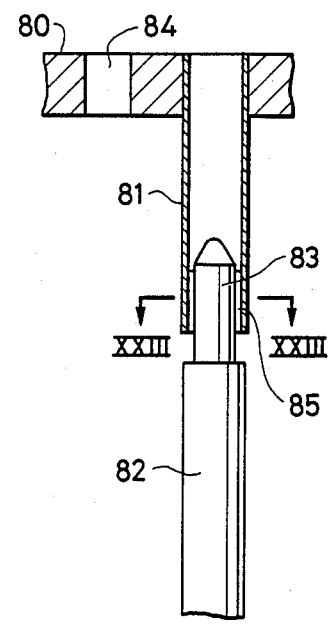
FIG. 22 is an enlarged sectional view of a part of the fuel assembly in FIG. 21.
Figure 23:
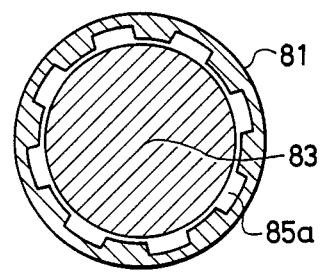
FIG. 23 is a sectional view taken along XXIII—XXIII of FIG. 22.

A further another embodiment will be described referring to FIGS. 21 to 23.

Figure 21:
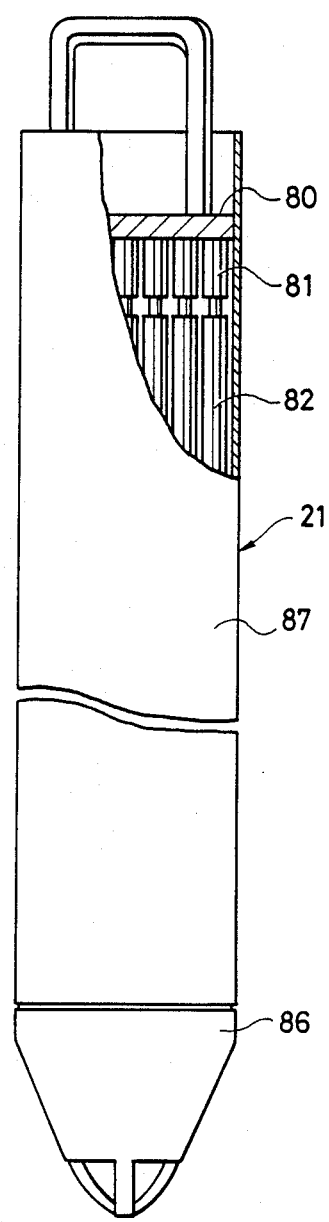
FIG. 21 is a partial sectional view of a fuel assembly.

In FIG. 21 showing a fuel assembly 21 of a BWR, fuel rods 82 are arranged in a square lattice of 8×8, and supported by an upper tie plate 80 with a upper ports 84, a lower tie plate 86 and spacers (not shown). The supported fuel rod bundle is contained in a channel box 87. In this embodiment, a lower end of a flow passage 81 made of a tubular member is connected to an upper end of a plug 83 of the fuel rod 82 by a slip joint 85 which is formed in the lower portion of the flow passage 81. An upper end of the flow passage 81 is secured to the upper tie plate 80. At the lower end of the flow passage 81, small lower flow ports 85a are formed by the outer surface of the plug 83 and the inner toothed surface of the slip joint 85. The total flow passage area of the lower flow ports 85a of the flow passage 81 is made minimal as compared with any other portion of the flow passage 81. Convex portions of the slip joint 85 partially contact with the plug 83 and have roles to prevent the fuel rod 82 from vibrating and to guide the fuel rod 82 in case of absorption of thermal expansion of the fuel rod 82. Concave portions of the slip joint 85 form flow passages 85a when the cooling water on the upper tie plate 80 is caused to flow in the fuel assembly 21. The flow rate of vapor flowing up through the flow passage 81 is controlled by the lower flow ports of the slip joint 85. Since the flow rate of the vapor at an upper portion 84 of the flow passage 81 is less than that at the flow ports of the slip joint 85, the cooling water is accumulated in the flow passage 81, and the water starts to fall when the static head of the water in the flow passage 81 become larger than the pressure loss of the passage 81, and then the water falls continuously, a steady downward flow is established in the flow passage 81. Thus the cooling water disposed on the upper tie plate 80 enters the fuel assembly against the vapor flowing up to cool the fuel rods.

We claim:

1. In a nuclear reactor having a pressure vessel, a core region disposed in said pressure vessel and containing therein a plurality of fuel assemblies, an upper plenum over said core region, an upper core plate having therein a plurality of holes and defining said upper plenum and said core region, a fluid passage for cooling water through said core region and said upper plenum, and an emergency core cooling system, said emergency core cooling system comprising a plurality of flow passages mounted on said upper core plate and extending downwardly into said core region for allowing the cooling water on said upper core plate prevented from falling down from said upper core plate by rising steam generated by said fuel assemblies when a level of the cooling water in said core region is lowered at a cooling water loss accident to fall down into said core region thereby cooling said fuel assemblies with the cooling water disposed on said upper core plate, said flow passages each having an upper end open to said upper plenum containing the cooling water and a lower end reduced in flow passage area and open to one of an upper and middle region of said core region.

2. An emergency reactor core cooling structure according to claim 1, wherein said flow passages each comprise a tubular member having the same inner diameter for flow passage at any portion other than said lower end.

3. An emergency reactor core cooling structure according to claim 2, wherein said each tubular member is provided with an orifice at the lower end portion opened to said core region.

4. In a nuclear reactor having a pressure vessel, a core disposed in said pressure vessel and containing therein a plurality of fuel assemblies, a fluid passage for passing cooling water through said core, and an emergency core cooling system, said emergency core cooling system comprising a plurality of flow passages each mounted on a perforated plate disposed substantially horizontally in the cooling water and extending downwardly from said perforated plate into the interior of said core, each of said flow passages having an upper end portion open to the cooling water on the upper side of said perforated plate and a lower end portion open to the interior of said core and reduced in flow passage area so as to provide a fluid flow restriction so that a flow rate of a fluid passing through said flow passage is reduced at the lower portion and the cooling water prevented from flowing down from the upper side portion of said perforated plate into said core by vapor generated in said core and flowing up in a cooling water loss accident flows down into said core through said flow passages against the vapor flowing up thereby to cool said core in a cooling water loss accident.

5. An emergency reactor core cooling structure according to claim 4, wherein said perforated plate is an upper core plate provided on an upper portion of said core, and an orifice member is provided at the lower end portion of said flow passage thereby forming the reduced flow passage area which is smaller than any other portion of said flow passage.

6. An emergency reactor core cooling structure according to claim 4, wherein a part of said flow passages consist of longer length flow passages and the remaining part of said flow passages shorter length flow passages shorter than said longer length fuel passages, all of which are mounted on said perforated plates which is an upper core plate provided on an upper portion of said core, and said longer and shorter length flow passages are disposed on the outermost peripheral portion of said fuel assemblies.

7. An emergency reactor core cooling structure according to claim 5, wherein the length of said flow passage is set to 0.08L–0.5L wherein L is a distance between said upper core plate and the lower end of said fuel assembly.

8. An emergency reactor core cooling structure according to claim 4, wherein a ratio R obtained by dividing a cross-sectional area of the reduced flow passage portion in said lower end portion of said flow passage by that of the upper end portion of said flow passage is set to a level within the range of 1.25–0.85.

9. An emergency reactor core cooling structure according to claim 4, wherein said fluid flow restriction of said flow passage is formed of an orifice member made of a shape memory alloy so that the cross-sectional area of said flow passage at said fluid flow restruction decreases at a high temperature and increases at a low temperature.

10. An emergency reactor core cooling structure according to claim 4, wherein said flow passage includes a shielding member made of a shape memory alloy and provided at a lower portion thereof so as to cover said fluid restriction, said shielding members covering said fluid flow restriction at a low temperature and opening at a high temperature.

11. An emergency reactor core cooling structure according to claim 4, wherein said emergency core cooling system further includes a water injection unit comprising a water storage tank containing high-temperature water and low-temperature water in a sealed state, and a water injection pipe communicating a low-temperature water portion of said water storage tank and said core with each other.

12. An emergency reactor core cooling structure according to claim 4, wherein each of said fuel assemblies comprises a tubular member for flow passage mounted on an upper tie plate at an upper end thereof and having a slip joint portion formed at a lower end thereof, said slip joint portion being connected to a plug provided on an upper portion of a fuel rod so that lower ports are formed between the lower end of said tubular member and said plug, a total cross-section area of said lower ports being smaller than that of the other portion of said tubular member.

13. In a nuclear reactor having a pressure vessel, a shroud disposed in said pressure vessel to form a downcomer, a core, defined by said shroud and upper and lower core plates supported by said shroud, and containing therein a plurality of fuel assemblies, a lower plenum defined by said lower core plate in said pressure vessel on the lower side of said core, an upper plenum defined by said upper core plate in said pressure vessel on the upper side of said core, a cold leg provided on said pressure vessel to communicate with said downcomer which communicates with said lower plenum, a hot leg provided on said pressure vessel to communicate with said upper plenum, and an emergency core cooling system, said emergency core cooling system comprising a plurality of tubular members each mounted on said upper core plate so as to open to cooling system comprising a plurality of tubular members each mounted on said upper core plate so as to open to cooling water on said upper core plate, and to extend downwardly therefrom into said core and an orifice member provided at a lower end thereof so as to open to the interior of said core and having a port whose cross-sectional area is smaller tan any other portions of said tubular member, so that the cooling water on said upper core plate flows down into said core through said tubular members against vapor flowing up and cools said core when a water level in said core is lowered and vapor is generated by heat from said fuel assemblies in an accident.

* * * * *